United States Patent [19]

Gribbin et al.

[11] Patent Number: 4,942,088
[45] Date of Patent: Jul. 17, 1990

[54] RECLAIMABLE POLYESTER FILM HAVING ADHESION-PROMOTING COATING

[75] Inventors: John D. Gribbin, Schlangenbad; Hermann Dallmann, Wiesbaden; Dieter Engel, Kelsterbach; Hartmut Hensel, Schlangenbad, all of Fed. Rep. of Germany

[73] Assignee: Hoechst Aktiengesellschaft, Frankfurt am Main, Fed. Rep. of Germany

[21] Appl. No.: 113,940

[22] Filed: Oct. 28, 1987

[30] Foreign Application Priority Data

Nov. 7, 1986 [DE] Fed. Rep. of Germany ....... 3637990

[51] Int. Cl.$^5$ .................. B32B 27/08; B32B 27/36; C08K 5/09
[52] U.S. Cl. .................. 428/336; 428/483; 428/413; 428/500; 524/158; 524/323; 524/422; 525/176
[58] Field of Search .......... 428/483, 455, 453, 336; 524/158, 323, 422; 525/176

[56] References Cited

U.S. PATENT DOCUMENTS 3,335,029  8/1967  Holben .................. 117/138.8
4,571,363  2/1986  Culbertson et al. ......... 428/483
4,592,953  6/1986  Farrar et al. ............. 428/332

FOREIGN PATENT DOCUMENTS 0146066  12/1984  European Pat. Off. .

Primary Examiner—George F. Lesmes
Assistant Examiner—Elizabeth M. Cole
Attorney, Agent, or Firm—Gregory N. Clements

[57] ABSTRACT

A reclaimable polyester film is disclosed which comprises an oriented polyester film which has been coated with an adhesion-promoting coating. The coating is applied to the film as an aqueous dispersion and is dried and crosslinked by the application of heat. The coating is prepared by the free-radical emulsion polymerizable of the following components:

(A) 1 to 99% by weight of a polymer having carboxy and epoxy groups in the form of an aqueous system with, (B) 1 to 99% by weight of at least one copolymerizable $\alpha$-$\beta$-olefinic unsaturated monomer, each with reference to the total solids content of the components, and (c) 0.01 to 10% by weight of at least one polymerization initiator, based upon the monomer proportion of the components (B), and (D) 0 to 20% by weight of anionic or nonionic emulsifiers or a mixture of both, or also of protective colloids, with reference to the proportion of component (B).

9 Claims, 1 Drawing Sheet

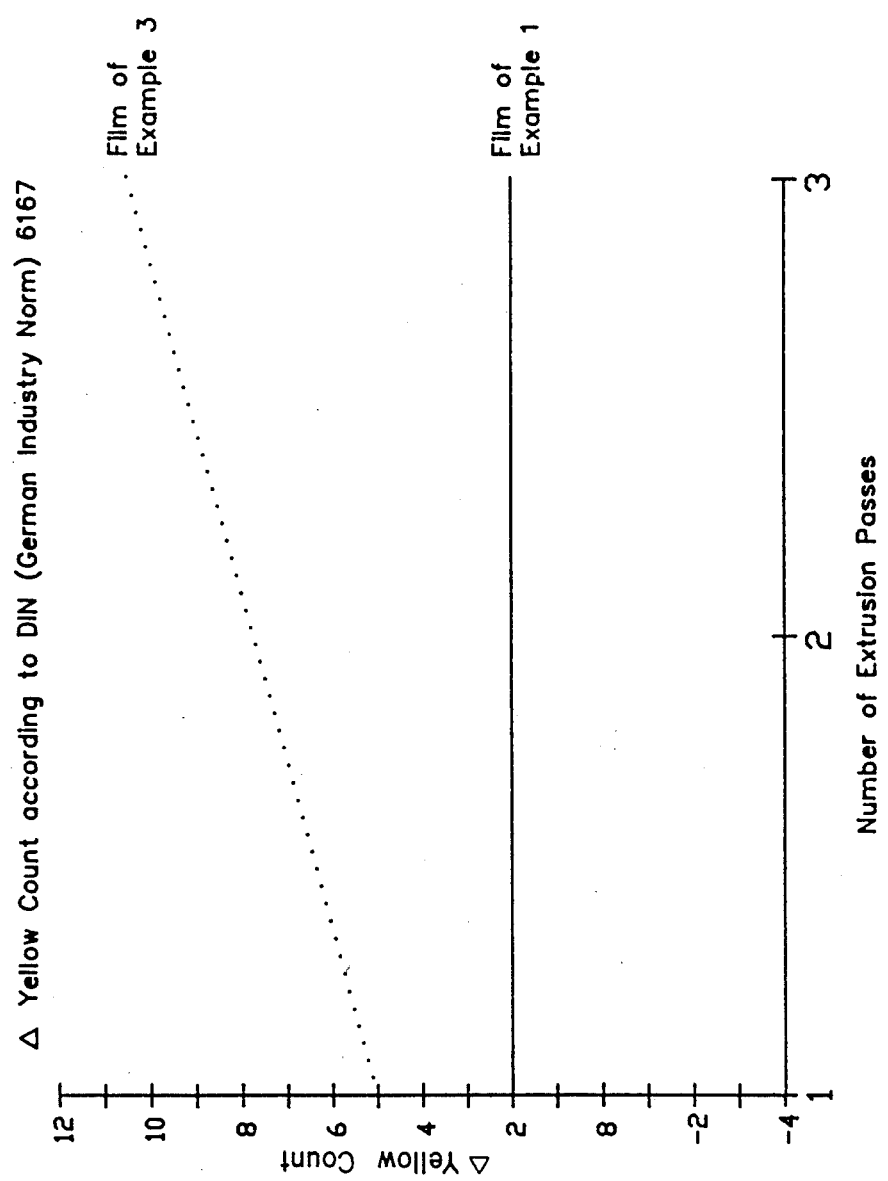

RECLAIMABLE POLYESTER FILM HAVING ADHESION-PROMOTING COATING

BACKGROUND OF THE INVENTION

The present invention relates to a melt-extruded, oriented, self-supporting polyester film coated on one or both surfaces with an adhesion-promoting coating.

Oriented polyester film, especially biaxially oriented film of polyethylene terephthalate (PET), is widely used as a base or carrier material for drafting film, photographic and reprographic film, as well as for packaging and labeling purposes.

PET film is hydrophobic and does not accept coating easily. In most cases where PET film is to serve as a base or carrier film for further coatings, it must first be coated with an adhesion-promoting coating on one or both sides. The adhesion-promoting coating adheres to the film and at the same time is capable of accepting further coatings. U.S. Pat. Nos. 2,627,088 and 2,698,240 describe an adhesion-promoting coating for PET film which is comprised of a terpolymer of vinylidene chloride, acrylic ester and itaconic acid. This adhesion-promoting coating is said to exhibit excellent adhesion to the polyester surface and also to subsequently added water- or alcohol-based photographic gelatin layers.

U.S. Pat. No. 3,674,531 describes an adhesion-promoting coating for PET film which contains copolymers of a vinyl halogen ester, for example, vinyl chloracetate, which can be copolymerized with many other monomers, such as acrylic and methylacrylic acids, -esters and -amides, olefins and vinyl alcohol. Such copolymers can also be cross-linked by the addition of melamine or urea-formaldehyde resin condensates. The adhesion-promoting coated PET film exhibits an improved adhesion with respect to many coatings, including reprographic coatings.

Some of these and other adhesion-promoting coatings for polyester film can, certainly, effectively improve the adhesiveness of PET film. The film manufacturer is also concerned that film waste created during the production process be recoverable. Film waste is normally reduced to small pieces, melted, worked into pellets, remixed with original polyester raw materials, melted again and re-added to the film extruder. During the processing of recovered PET film, temperatures can be between 270 degrees Celsius and 310 degrees C. Many of the above-mentioned adhesion-promoting coatings are not stable at these temperatures. Oriented PET film containing considerable amounts of such recovered adhesion-promoting coatings tends to exhibit an undesirable yellow or black color. This is especially true if the film contains significant amounts of coated film waste which has been reclaimed by repeated passes through the extruder. This is the case with the adhesion-promoting coatings for PET film which contain vinylidene chloride described in U.S. Pat. Nos. 2,627,088 and 2,698,240, as well as with the adhesion-promoting coatings based on copolymers containing vinyl chloracetate according to U.S. Pat. No. 3,674,538. It has been found that the coloration and degradation of these adhesion-promoting layers during the reclamation process can most likely be attributed to the dechlorination or dehydrochlorination and to the degradation products arising therefrom.

U.S. Pat. No. 3,819,773 describes adhesion-promoting thermoset acrylic or methacrylic coatings which can be applied to the PET film from an aqueous medium. Such an adhesion-promoting coating improves the adhesion of reprographic and drafting coatings based on organic solvents. This patent also describes the recovery of an adhesion-coated film, with the therein described thermoset acrylic coatings, by mixing it with at least 50% by weight original polyester raw materials and resupplying the film extruder with this mixture. Although the patent mentions a reduction of discoloration and degradation problems compared with chlorine-containing adhesion-promoting coatings, the acrylic coatings according to the patent, which have been cross-linked with the therein described resin-shaped cross-link-agents, still cause an undesirable yellow coloration of a finished film containing such an adhesion-promoting coated film as reclaim material, especially when compared to a film comprised solely of original polyester raw material.

The object of the present invention is an adhesion-promoting coating for polyester film which, in addition to adhesion-promoting coatings comparable to those known in the state of the art, does not lead to substantial yellowing of the finished film if a film coated with adhesion-promoting coating is added to the production process as reclaim material, especially in comparison to a film consisting solely of virgin polyester raw material.

BRIEF SUMMARY OF THE INVENTION

In one aspect, the present invention relates to an improved reclaimable polyester film comprising an oriented polyester film and an adhesion-promoting coating applied to at least one side of said polyester film, wherein said adhesion-promoting coating comprises a copolymer of (A) at least one self-curing polymer having carboxy-functional and epoxy functional groups, and (B) at least one α,β-olefinically-unsaturated copolymerizable monomer.

In another aspect, the present invention relates to an improved process for the manufacture of coated polyester film, in which the adhesion-promoting coating comprises a copolymer of (A) at least one self-curing polymer having carboxy-functional and epoxy functional groups, and (B) at least one α,β-olefinically-unsaturated copolymerizable monomer, and wherein said coating is applied to as an aqueous dispersion to said film after said film has been stretched in one direction, but prior to stretching said film in a second direction perpendicular to said first direction, in which the heat supplied to said film during said stretching steps is sufficient to remove the water and other volatile constituents from said adhesion promoting coating and to dry and crosslink the latter.

In yet another aspect, the present invention relates to an adhesion-promoting coating composition produced by the free-radical emulsion polymerization of the following components:

(A) 1 to 99% by weight of a polymer having carboxy-functional and epoxy functional groups in the form of an aqueous system with, (B) 1 to 99% by weight of at least one copolymerizable monomer of α-β-olefinic unsaturation, the percentages each time relating to the total solids content of the components, and (C) 0.01 to 10% by weight of at least one polymerizable initiator, relative to the monomer content of component (B), and (D) 0 to 20% by weight of anionic or nonionic emulsifiers or of a mixture of the two or of protective colloids, relative to the monomer proportion of component (B).

said polymerizable being performed at a temperature between 0° and 150° C.

BRIEF DESCRIPTION OF THE DRAWINGS:

The sole drawing is a graph which compares the color difference between various coated films against an uncoated film control sample against the number of repetitive passes through an extruder.

DETAILED DESCRIPTION OF THE INVENTION

This object is accomplished by a film of the type summarized above, the distinguishing characteristics of which are that the adhesion-promoting coating is applied as an aqueous polymer dispersion containing a polymerizate derived by means of radical emulsion polymerization based on a self-curing carboxy-functional polymer (a polymer containing carboxy-functional groups), with additional epoxy groups, and of at least one copolymerizable α-β-olefinic unsaturated monomer.

The aqueous polymer dispersion designed as an adhesion-promoting coating can have a solids content in the range of from 2 to 75% by weight, preferably in the range of 4 to 65% by weight, based upon the total weight of the polymerizate dispersion. The solids content is preferably adjusted such that a dry coating thickness in the range of approximately 0.0025 to 0.25 μm results; expressed in dry weight this represents a coating weight of 0.00305 g/m$^2$ to 0.305 g/m$^2$. The dried adhesion-promoting coating of cross-linked acrylic copolymers has a preferred thickness in the range of approximately 0.015 to 0.05 μm, whereby 0.025 μm is the desired thickness.

For the radical emulsion polymerization, the following components are converted at a temperature between 0 degrees C. and 150 degrees C. in the presence of further common additives:

(A) 1 to 99% by weight of a carboxy-functional polymerizate in the form of an aqueous system with (B) 1 to 99% by weight of at least one copolymerizable α-β-olefinic unsaturated monomer, each with reference to the total solids content of the components, and (C) 0.01 to 10% by weight of at least one polymerization initiator, based upon the monomer proportion of the components (B), and (D) 0 to 20% by weight anionic or nonionic emulsifiers or a mixture of both, or also of protective colloids, with reference to the monomer proportion of the components (B).

By the appropriate choice of starting materials it is possible to adjust polymerizate characteristics within broad limits. For example, water-soluble or water-dispersable polymerizates can be manufactured by polymerization of non-cross-linkable vinyl monomers in an aqueous dispersion or solution of an uncured, self-cross-linking, carboxy-functional polymer (a polymer containing carboxy-functional groups). In this way, for example, the hydrophilic and hydrophobic characteristics and the hardness or flexibility, can be influenced by appropriate choice of components (A) and (B). Moreover, water-dispersible polymerizates can be manufactured by means of the inclusion of reactive vinyl monomers. These polymerizates are preferably crosslinked with an appropriate post-treatment, following the application of the adhesion-promoting coating to the film.

Appropriate polymers for the component (A) may be manufactured as described in German Offlengungsschrift No. 28 11 913 by means of the conversion of (a) halogen-free polycarbon acid units, (b) salt-forming substances selected from the group consisting of alkali, alkaline earths, and quarternary ammonium salts, organic bases and/or ammonia, (c1) OH-groups containing polymers with a OH count of 20 to 150 and/or (c2) epoxy compounds and subsequent solution and/or dispersion in water. The polymers contain at least 3 of the 4 indicated units. The average molecular weight of such compounds lies in the range of from 2,000 to 100,000, preferably 6,000 to 50,000 (gel chromatography, polystyrene standard).

Compounds coming within the scope of component (B) include α-β-olefinic unsaturated monomer. Practically all radical polymerizable monomers are to be considered, whereby however for copolymerizations the usual reservations apply, which are given in the Q- and e-schedule according to Alfrey and Price or prescribed for copolymerization parameters, respectively (compare, for example, Brandrup, Immergut, Polymer Handbook, 2nd ed., 1975, John Wiley & Son, New York).

The utilization of hydrophilic monomers is possible but not generally necessary to conduct the polymerization according to this invention.

Suitable α-B-olefinic unsaturated monomers are, for example, (meth)acrylate monomers such as methyl (meth)acrylate, ethyl(meth-)acrylate, propyl(meth)acrylate, the various butyl(meth)acrylates, 2-ethylhexyl(-meth)acrylate, glycidyl(meth-) acrylate, (meth)acrylic amide, N-methylol(meth)acrylic amide, (meth)acrylic nitrile and also methacrylic acid itself, vinyl aromatic monomers such as styrene, α-methylstryene, vinyl toluene, vinyl pyridine, vinyl ester monomers such as vinyl acetate, vinyl esters of branched ($C_{19}$–$C_{12}$)-carboxylic acids such as versatic acid vinyl ester; linoleic acid vinyl ester, α-β-ethylenically unsaturated mono- and dicarboxylic acids such as crotonic acid, maleic acid, itaconic acid, sorbic acid or their esters and partial esters, methacrylic ester, partially and/or completely fluorinated alcohols corresponding to the general formula

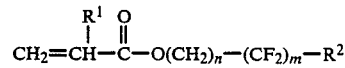

with $R^1$=H, $CH_3$; $R^2$=H, F, n=0–10 and m=0–25, hexafluoropropylene, perfluorohexylethylene, 2-hydroperfluoroethylallyether and 2-hydroprfluoropropylallyether, monomers of the type multiple, preferably two- to threefold ethylenically unsaturated compounds such as divinylbenzol, ethanedioldi(meth)acrylate, propandioldi(meth)acrylate, butandioldi(meth)acrylate, hexandioldi(meth)acrylate, glycerotrimethacrylate, pentaerythritoltrimethacrylate and diallylphthalate.

If multiple ethylenic unsaturated monomers are used, their quantity is in general 0.01 to 20% by weight, with reference to the total quantity of the monomers (B). By means of the addition of these monomers working as cross-linking groups, dispersions with partially or completely cross-linked particles can be manufactured.

In order to cause cross-linking of the adhesion-promoting coating, it is advisable that monomer units with functional groups are present in the copolymerizate, both in the instance of self-cross-linking as well as externally induced cross-linking. To be considered as monomers with functional groups are those which carry chemical groupings, in addition to the olefinic double bond with which they are polymerized at manufacture into the arising copolymerizate which can later be converted with chemical groupings of the same or of a different type, preferably after the application of the finished polymerizate dispersion under the influence of thermal or radiant energy and/or catalysts, such that cross-linking results.

Examples of suitable chemical groupings, which can cause cross-linking in the applied adhesion-promoting coating, are carboxylic acid-, sulfonic acid-, hydroxy-, amino-, amido-, keto-, aldehyde-, lactam-, lacton-, isocyanate-, and epoxy functional groups. Copolymerization-capable monomers having such functional groupings are known.

Monomers being used, carrying carboxylic acid groupings, are in general crotonic acid, sorbic acid, itaconic acid, fumaric acid, maleic acid, maleic acid half ester or the partial ester of the itaconic and the fumaric acid, respectively. Acrylic and methacrylic acid are preferred.

Monomers having epoxy groupings suitable for cross-linkage include glycidylmethacrylate, glycidylacrylate, and allyglycidylether.

Additional copolymerizable monomers include monomers having isocyanate groups such as isocyanatoethyl(meth)acrylate as well as its derivatives with a blocked isocyanate group, aminoalkyl compounds such as methylaminoethyl(meth)acrylate and tert.-butylaminoethyl(meth)acrylate, N-alkoxyalkylamide such as methyoxy- or ethoxmethyl(meth)acrylamide, hydroxyalkylester such as hydroxyethyl- and hydroxypropyl- (meth)acrylate, and the corresponding compounds of the named (meth)acrylic acid derivatives of other ethylenic unsaturated acids such as maleic-, itaconic-, crotonic-, and sorbic acid.

Preferred dispersion copolymerizates can contain as monomer units, with reference to the quantity of the components (B) up to 100% by weight methylmethacrylate and/or n-butylacrylate, 0 to 20% by weight hydroxyethylmethacrylate, 0 to 20% by weight glycidylmethacrylate and 0 to 20% by weight acrylic acid and/or methacrylic acid, whereby the sum of the monomer units is always 100%. Especially preferred is a mixture ratio containing as monomer units 15 to 80% by weight methylmethacrylate, 15 to 50% by weight n-butylacrylate, 0 to 15% by weight hydroxyethylmethacrylate, 0 to 15% by weight glycidylmethacrylate and 0 to 5% by weight acrylic acid and/or methacrylic acid.

The proportions of the components (A) and (B) can vary within broad limits, according to whether soft or hard, or in some instances, flexible polymer characteristics are required. Preferably, 5 to 95% by weight of the components (A) with 5 to 95% by weight of the monomers (B) converted, whereby the proportions are in reference to the total solids content of the components. The self-curing components (A) are, in general, utilized in the form of a 5 to 65% by weight aqueous system.

The emulsion polymerization is conducted in an aqueous medium at temperatures in the range of between 0 and 150 degrees C., preferably 20 and 100 degrees C., especially 40 and 90 degrees C. In this manner the carboxy-functional polymers are polymerized (A) with the vinyl monomers (B) with the addition of a polymerization initiator (C) and possibly of further common additives such as emulsifiers and or protective colloids (D) and molecular weight regulators. The aqueous medium of the polymerzation mixture can stem from the aqueous systems of the components (A), but in general more water is added to the mixture in order to attain the best conditions for the emulsion polymerization.

The polymerization can be conducted in such a manner that the carboxy-functional polymer, (A) has been added as an aqueous system to which the entire amount of the water present at polymerization together with a part of an initiator and in some instances with an emulsifier and a molecular weight regulator, pre-heated to the desired polymerization temperature. At this point, the monomer mixture (B) as well as the rest of the initiator, is slowly added. It is, however, possible to mix in each case a portion of the water, the carboxy-functional polymers (A) and in some cases the emulsifier and to produce a pre-emulsion. The remaining water, component (A), the vinyl monomers (B), and in some cases the emulsifier (D) which then is slowly added to the reaction vessel which has been pre-heated to polymerization temperature and provided with a polymerization initiator. Addition time is generally 30 to 180 minutes. Following completion of the addition of the monomer mixture, the entire mixture is agitated for 1 to 3 hours at 60 to 90 degrees C., preferably 70 to 85 degrees C. In some circumstances a further initiator may be added, in order to achieve a complete conversion of the vinyl monomers. The average molecular weight $M_w$ of the resulting polymer is in general 50,000 to 10 million, preferably 75,000 to 1 million, relative to polystyrene standard gel chromatography.

At least one polymerization initiator is generally used as component C in the emulsion polymerization. Radical forming initiators include percarbonates, peresters such as tert.butylperpivalate, peroctoate, benzoylperoxide, dichlorbenzylperoxide, azodiisobutyric acid dinitrile, especially however peroxy-compounds or aliphatic azo compounds. The initiator can be water-soluble and/or monomer-soluble. Preferred initiators include sodium-, potassium-, ammonium peroxyide sulfate, or sodium-, potassium-, ammonium sulfides, -sulfites or other reducing agents. The amount of polymerization initiator is in general 0.01 to 10, preferably 0.02 to 5, especially 0.05 to 3% by weight, relative to the total amount of the vinyl monomers (B).

The polymerization can be conducted in the presence or absence of an emulsifier and/or protective colloids (D), using anionic and/or nonionic emulsifiers. Examples of anionic emulsifiers are the alkali- and ammonia salts of sulphuric acid partial esters of alkylphenols or the above-mentioned alcohols or also alkyl- or arylsulfonate, preferably the alkali salts of the sulphuric acid half esters of a nonylphenol converted with 4 to 5 mol ethylene oxide, sodium lauryl sulfate, sodium lauryl ethoxylate sulfate, and secondary sodium alkane sulfonates, the carbon chains of which contain 8 to 12 C-atoms.

A nonionic emulsifier can be added to increase the stability of the aqueous copolymer dispersion. Suitable emulsifiers include ethoxylated alkylphenols or fatty alcohols, for example, nonylphenol with 4 to 30 mol ethylene oxide, in mixture with the anionic emulsifier.

The amount of the anionic emulsifier is 0 to 15% by weight, relative to the vinyl monomers (B).

A "fluorinated surfactant", defined as a compound containing as components perfluoroalkyl residues with 2 to 20 C-atoms or perfluoraralkyl residues in the molecule, can also be used as an emulsifier. Suitable compounds include perfluoralkylsulfonic acids, perfluoraralkylsulfonic acids, long-chain perfluoralkylcarbonic acids, perfluoralkane phosphonic acids, -phosphinic acids, with in each case 1 to 15 C-atoms in the alkane residue, the salts of these acids, perfluoralkylsulfates and perfluoraralkylsulfate.

The molecular weight of the polymerizate can, in known fashion, be reduced through the use of molecular weight regulators such as mercaptane, halogen-containing compounds and other radical-transmitted substances. Preferred compounds are butylmercaptane, octylmercaptane, dodecylmercaptane, tetrakismercaptoacetylpentaerythrite, chloroform, bromoform, trichlorethylene, trichlorbromomethane, carbon tetrachloride and toluene.

The polymerizate dispersion used for the invention's adhesion promoting coating is self-cross-linking. In addition, however, there is the possibility of external cross-linking. For this, a copolymerizate dispersion, carrying one or several of the named functional monomer units, is mixed during the emulsion polymerization with a further low molecular weight oligomer and/or polymer compound which also bears functional groupings.

The cross-linkage occurs similarly when employing external cross-linking agents, preferably during drying of the adhesion-promoting coating applied to the film in the form of an aqueous polymer dispersion; it is favored by means of the reaction between the polymerizate dispersion and the added foreign components. Of course, the entry of both components into reactions with themselves and/or cross-linkages cannot always be avoided.

External cross-linking components include, for example, acrylate resins and masked isocyanate resins, that is, iscoyanate resins with blocked isocyanate group, which with or without the effect of catalysts such as maleic-, citric-, phosphoric-, alkylphosphoric acid, p-toluene sulfonic acid and/or naphthalene disulfonic acid in the presence of co-polymerizates which preferably carry hydroxyl-, amide- or carboxyl groups, can result during the drying process in highly cross-linked coatings. Especially preferred are acrylic resins and/or methylethered melamine resins as foreign cross-linking components.

The adhesion-promoting coating can be applied to the polyester film at each appropriate stage during or after film production, i.e., before or between the stretch procedures (in-line) or after production of the film (off-line). After application it is heat dried and cross-linked by means of admission/inlet/supply. The resulting adhesion-coated polyester film exhibits excellent adhesion with respect to many post-applied coatings based on organic solvents. It is especially suited for use as recovered material in the re-processing of polyester film, without causing significant film discoloration or degradation.

The oriented polyester carrier film is preferably comprised of polyethylene terephthalate. The invention can be used just as well with films based on a crystallizable polyester prepared by polycondensation of a glycol, for example, ethylene glycol or butylene glycol and their mixtures, with terephthalic acid or mixtures thereof with other dicarbonic acids such as isophthalic acid, diphenic acid and sebacic acid or their polyester-forming equivalents, according to known procedures. The film can also be produced according to known procedures and with known devices. For example, a polyester melt can be prepared, which is then extruded as amorphous film onto a highly polished rotating casting roller, where it solidifies to a cast film. The film is then stretched axially, with a monoaxially oriented film in one direction, i.e., either in the extrusion direction (longitudinal) or perpendicular to the extrusion direction (transverse) and with a biaxial oriented film in two directions, i.e., not only longitudinal but also transversely. In the first stretching phase of the cast film one may stretch in either of these mutually perpendicular directions. Simultaneous stretching is also possible. The degree of stretch, by which the film acquires stiffness and toughness, can be approximately 3- to 5-fold of the original dimension of the cast film in one or both directions. The preferred degree of stretch is in the range of 3.2- and 4.2-fold of the original dimension.

The stretch procedures are performed at temperatures in the range of ca. from the glass point temperature to below the temperature at which the polymer becomes soft and melts.

Following stretching the film is heat-treated for the time necessary to crystallize the polyester. By means of this crystallization the film acquires firmness and good tensile strength characteristics. The heat treatment of polyethylene terephthalate is performed at a temperature between ca. 190 and 240 degrees C., preferably between ca. 215 and 235 C.

The coating of the present invention is preferably applied "in-line" during the film production in the form of an aqueous dispersion or emulsion. The coating may be applied prior to the stretching, i.e. at the time between the casting of the amorphous film and the first stretching, or at the stage between the stretch procedures, i.e. after stretching in one direction and before stretching in a second direction, as described in U.S. Pat. No. 3,819,773, or after stretching but before heat-setting. The warmth added to the film in stretching or in the concluding heatsetting stages is normally sufficient to disperse water and other volatile components from the adhesion-promoting coating, to dry it, and to cross-link it.

In a preferred embodiment the adhesion-promoting coating is applied after uniaxial stretching of the film, i.e. after stretching the film in one direction, but prior to stretching at the right angle. In a further preferred embodiment the polyester film is stretched lengthwise prior to application of the coating. In this preferred embodiment the film is coated after longitudinal stretching according to one of the known methods. Coating can, for example, be accomplished by roller coating, spray coating, gravure coating, die coating, or dip-coating. The preferred method is gravure. Prior to coating, the uniaxially stretched film is preferably subjected to a corona treatment. The corona treatment reduces the hydrophobic character of the polyester film surface, whereby the wetting of the film surface by aqueous dispersion is improved and with it the adhesion of the coating.

The coating can be applied to on one or both sides of the film. It is also possible to coat only one side of the film with the invention's coating and to apply a different coating to the other side. The coating formula can contain known additives such as antistatic agents, wetting agents, surfactants, pH-regulators, antioxidants, fillers, dyes, slip agents, and anti-block substances such as colloidal $SiO_2$, etc. Normally, it is appropriate to work-in a surfactant to increase the propensity of the aqueous coating to wet the polyester base film.

The adhesion-promoting coatings of the present invention possess excellent heat stability. Therefore the film scrap created during the production of the coated film can be mixed with fresh polyester and re-extruded to produce an oriented film. The terms "fresh polyester" and "original polyester raw material" used here denote a polyester which does not include recycled materials, for example, from films or fibers, but rather itself is used for the first time in the manufacture of such products. A film produced in this manner containing from 5 to ca. 70% by weight of reclaimed material from a coated scrap, preferably containing 50% by weight of reclaimed and fresh polyester, proves to be of very good quality, color and appearance, and shows, at the most, a very low, practically imperceptible degradation of the characteristics due to the impurity resulting from the coating. The coated film, according to the invention, thus offers a clear economic advantage to the manufacturer in comparison to many other coated films such as films which are coated with polymers containing vinylidene chloride, as in U.S. Pat. Nos. 2,627,088 and 2,698,240, which are inclined to polymer degradation and to discoloration if reclaimed as described above. Similar advantages result relative to the thermoset acrylic coatings, which contain resin-shaped cross-linkage agents, as described in U.S. Pat. No. 3,819,773, or compared to the vinyl acetate polymers with resin-shaped cross-linkage agents described in British Patent Specification No. 1,497,657.

The invention's re-extruded film can contain so much coated recovered film that the content of cross-linked adhesion-promoting coating amounts to as much as 1.0% by weight, preferably 0.01 to 0.5% by weight, based upon the weight of the film.

A polyester film coated with the invention's composition is excellently well-suited as a base film in the production of light-sensitive reprographic film. In the production of such films a light-sensitive coating is applied to the surface of the adhesion-promoting coated polyester film. The light-sensitive coating typically consists of a solution of a binder containing diazonium compound or impregnated with a resinous binder in an organic solution, and the light-sensitive coating is then dried. Appropriate resinous binders for this purpose include cellulose acetobutyrate, cellulose acetate, cellulose acetopropionate, as well as vinyl polymers such as polyvinyl acetate. Acetone, methyl ethylketone, methyl isobutylketone, ethylene glycol monomethylether and mixtures of these substances are suitable as solvents. The reprographic coatings and the processes for their application and use are known.

Similarly, the invention's adhesion-promoting coated polyester film is an excellent substrate for the application of matte coatings, whereby the film is to be used as drawing material. These coatings typically comprise a resinous binder and a finely distributed, particulate material serving as a "seed". As resinous binders, the aforementioned materials as well as acrylic- or methacrylic resins can be used. The organic solvents can be those solvents listed above. Kaolins or $SiO_2$ are among the particulate materials (particle size under 10 $\mu$m). In such matte coatings other components, such as thickening agents or dispersants, can be contained. Matte coatings of this type are known from Great Britain Patent Specification No. 1,072,122 and U.S. Pat. No. 3,624,021.

The invention's adhesion-promoting coated film can also be used as a packaging or labeling material, if the opacity or transparency is not influenced. Compared with uncoated film, the adhesion-promoting coated films display an improved adhesion with respect to printing inks based on organic solvents. These printing inks can be prepared by dispersing or dissolving pigments or dyes in a combination of acrylic or other resins with thickening agents.

The excellent adhesion of the polyester film coated with the invention's cross-linked acrylic copolymer layers to the coatings applied to it and based on organic solvents makes such a film universally suitable for the manufacturer of ready reprographic, graphic and packaging materials.

Finally, the film coated with the invention's adhesion-promotion layer is also especially suitable for use as a base film for magnetic tapes such as audio- video- or computer tapes. Such a carrier film preferably possesses a multi-layered structure, whereby at least one of the levels contains finely and dispersely distributed inorganic and/or organic particles in a size and amount such that the surface structure of this side of the film does not have a negative effect on the surface roughness of the opposite side of the film or the magnetic layer of the tape. Examples of such particles are $CaCO_3$, $BaSO_4$, $SiO_2$, natural or synthetic silicates, natural or pyrogenic aluminum oxide, $TiO_2$, $ZnO$, $MgO$, and carbon black, as well as particles of polymer materials as, for example, plastomers, elastomers, and duromers.

EXAMPLES

In the examples described below, the invention is explained in more detail.

The reprographic adhesion was determined with a lacquer of the following composition: 9 parts by weight cellulose acetobutyrate (20-second-type), dissolved in a mixture of 88 parts by weight ethylene glycol monomethylether and 3 parts by weight methylethylketone, whereby rhodamine B was added as a dyestuff (3 parts by weight of a 1% solution of rhodamine B in n-Butanol). The lacquer was applied with the assistance of a wire-wound rod (Meyer Rod No. 70) to the coated surface of the film and oven-dried for 5 minutes at 60 degrees C. A cross-hatching was made with a scalpel into the coating, an adhesive tape (Scotch Tape 610) pressed onto the hatched surface, pressed firmly with a finger nail, and then quickly pulled away from the film. The lacquer remaining on the hatched surface is estimated as a percentage of the total applied lacquer, i.e. no lacquer removed=100% adhesion, all lacquer removed=0% adhesion; the adhesion values between 0 and 100% denote the portion of the lacquer remaining on the film. The experiment was conducted twice on two film sheets (i.e. a total of four places), and the value of the test area with the worst result reported as the adhesion value.

EXAMPLE 1

A latex was produced with 4% solids content which consisted of a copolymer of 30% by weight of a carboxyfunctional polymer, containing additional epoxy groups, 35% by weight methylmethacrylate, 30% by weight butyl acrylate, 5% by weight glycidylmethacrylate, each with reference to the total weight of the solids. As carboxyfunctional polymers with additional epoxy groups the reaction products of components of an anhydrous mixture and an OH-group were used.

The anhydrous mixture was prepared by conversion of trimellitic acid anhydride with propane-1,2-diol and consists of trimellitic acid anhydride and the anhydrides of Formulas I and II.

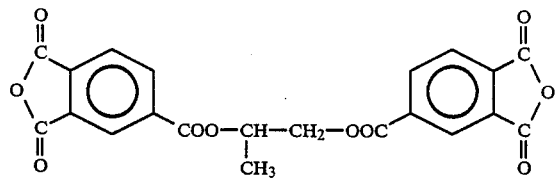
(I)

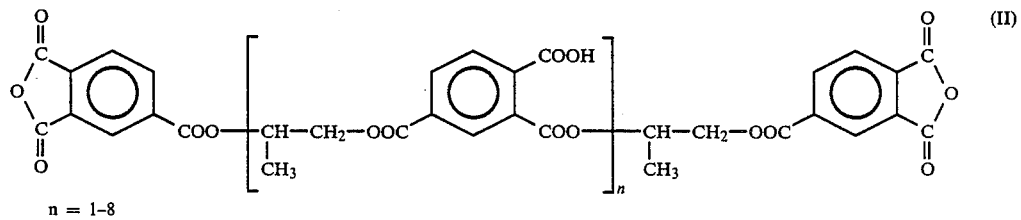
(II)

n = 1-8

As components containing OH-groups polyesters can be used which are produced on the basis of phthalic acid anhydride, isophthalic acid, maleic acid anhydride, propanol and glycerin, as described in No. DE-A-28 11 913. This latex was applied to a polyester film as an adhesion-promoter.

In the production of polyester film a polyethylene tere- phthalate-granulate was melted and formed to a melt film by means of a wide-slit die. The melt film was put onto a casting drum maintained at 20 degrees C. The resulting amorphous film was longitudinally stretched to a stretch ratio of ca. 3.6:1, whereby it was maintained at a temperature of 80 degrees C. The longitudinally-stretched film was corona-treated and thereafter, by means of a reverse gravure system, coated with the latex described above.

The longitudinally-stretched, corona-treated and coated film was dried at temperature of ca. 100 degrees C. Thereafter the film was stretched in the transverse direction to a ratio of 3.6:1 to produce a biaxially stretched film.

The biaxially stretched 15 μm thick film was heat-set at a temperature of 230 degrees C.

The dry weight of the coating was ca. 0.035 g/m², the thickness of the carrier film ca. 12 μm.

EXAMPLE 2

A biaxially stretched 50 μm thick polyester film was produced in the usual manner.

This film was then corona-treated and by means of reverse gravure coating coated with the latex described in Example 1; mixture of ca. 0.50 g/m². The film was then dried at 125 degrees C.

The haze of the coated film was 5% and thus not affected by the coating.

EXAMPLE 3

Example 1 was repeated, but in this instance the copolymer present in the latex contained approximately equimolar portions of ethylacrylate and methacrylate copolymerized with 5% by weight methacrylamide and of the remaining 20%, relative to the dry weight of a melamine formaldehyde resin as cross-linking agent.

EXAMPLE 4

Example 2 was repeated, but with the latex described in Example 3.

Each of the films produced according to the examples 1 through 4 was tested for its adhesive properties with a lacquer as described above.

The adhesion results were as follows:

TABLE I

| Example | % Adhesion |
|---|---|
| 1 | 100 |
| 2 | 80 |
| 3 | 100 |
| 4 | 80 |
| Control (not coated) | 0 |

Test of Recoverability

The recoverability of each film was assessed by reducing each test of the coated film to flakes, putting them through a strand extruder at a temperature of ca. 280 degrees C., and cutting the resulting strand extrudate into pellets. The pellets were then each re-extruded at 280 degrees C. and then pelletized twice.

A visual test of the relative discoloration of the heat-treated test pellet thus produced showed that the pellets containing the coated film from Example 3 were considerably more yellow and darker than the pellets containing the coated film from Example 1 as claimed in this invention.

Measurements of the yellow color according to DIN 6167, in which the difference in yellow index, (Δ yellow index), is plotted against the number of the extrusion passes of 1 through 3, show an increase of the Δ yellow index in comparison to the non-coated film which also had also been re-extruded, of +1 to 2 for Example 1 and +10 to 11 for Example 3. This is graphically illustrated in the Figure.

We claim:
1. A reclaimable, adhesion-promoting coating composition, suitable for use in the manufacture of coated polyester films, produced by the free-radical emulsion polymerization of the following components:
   (A) 1 to 99% by weight of a polymer having carboxy and epoxy functional groups in the form of an aqueous system, produced by reaction of a hydroxy-functional reactant consisting of polyester containing OH groups, and an anhydrous mixture prepared from the conversion of trimellitic acid anhydride with propane-1,2-diol, with;

(B) 1 to 99% by weight of at least one copolymerizable monomer of $\alpha,\beta$-olefinic unsaturation, the percentages each time relating to the total solids content of the components, and (C) 0.01 to 10% by weight of at least one polymerizable initiator, relative to the monomer content of component (B), and (D) 0 to 20% by weight of anionic or nonionic emulsifiers or of a mixture of the two or of protective colloids, relative to the monomer proportion of component (B) said polymerization being performed at a temperature between 0° C. and 150° C.

2. The reclaimable adhesion-promoting coating composition of claim 1 wherein components (A) and (B) are each added in an amount of 5 to 95% by weight, each time related to the total solids content of these components.

3. The reclaimable adhesion-promoting coating composition of claim 1 wherein component (B) is comprised of 15 to 80% by weight of methyl methacrylate, 15 to 50% by weight of n-butyl acrylate, 0 to 15% by weight of hydroxyethyl methacrylate, 0 to 15% by weight of glycidyl methacrylate and 0 to 15% by weight of acrylic and/or methacrylic acid, each time related to the amount of component (B).

4. A reclaimable-coated polyester film, comprising: an oriented polyester film, said film having the adhesion-promoting coating of claim 1 applied to at least one side of said film.

5. The reclaimable polyester film of claim 4, wherein said adhesion-promoting coating has a dry thickness in the range of from 0.002 $\mu$m to 0.25 $\mu$m.

6. The reclaimable polyester film of claim 5 wherein the dry thickness of said adhesion-promoting coating lies in the range of from 0.01 to 0.05 $\mu$m.

7. The reclaimable polyester film of claim 4 wherein said polyester film contains from 5 to 70 percent by weight of reclaim material comprising the coated polyester film of claim 1.

8. The reclaimable polyester film of claim 7 wherein said polyester film contains up to 1.0 percent by weight, based upon the weight of the uncoated polyester film, of said adhesion-promoting coating.

9. The reclaimable polyester film of claim 8 wherein said polyester film contains from 0.01 to 0.5 weight percent, based upon the weight of the uncoated polyester film, of said adhesion-promoting coating.

* * * * *